Sept. 29, 1964         D. BERLIN         3,150,616
                    CONVERTIBLE CART
Filed Oct. 25, 1961                    3 Sheets-Sheet 1
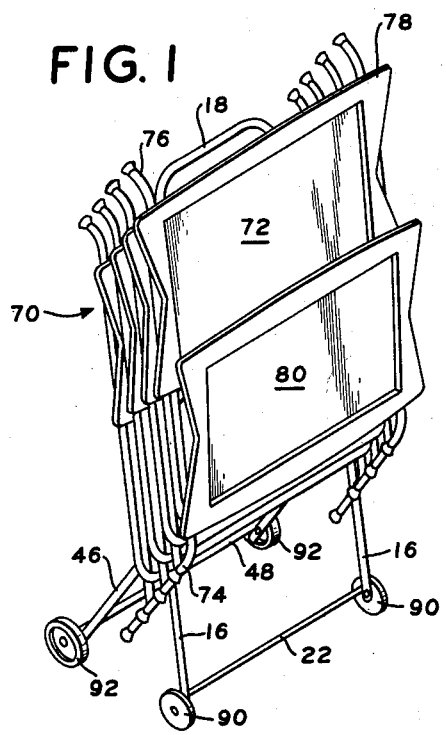
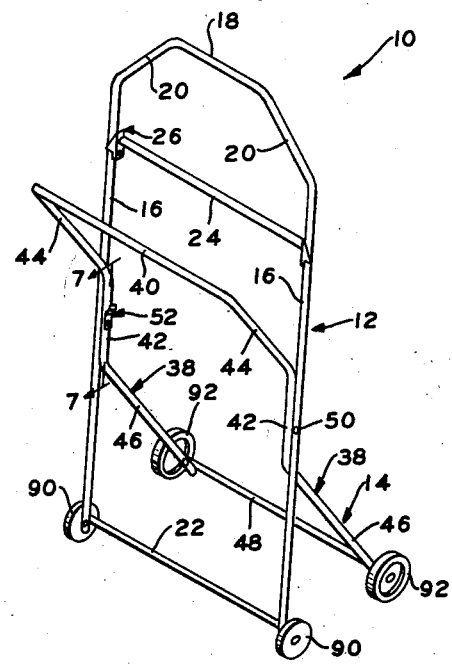
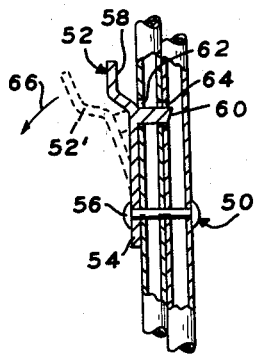
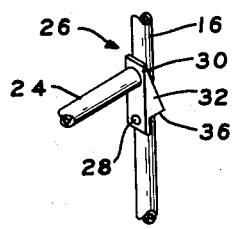
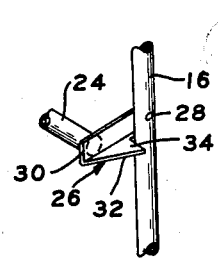
INVENTOR.
DANIEL BERLIN
BY
*Caesar and Rivise*
ATTORNEYS Sept. 29, 1964      D. BERLIN      3,150,616
CONVERTIBLE CART Filed Oct. 25, 1961      3 Sheets-Sheet 2

INVENTOR.
DANIEL BERLIN
BY
Caesar and Rivise
ATTORNEYS.

Sept. 29, 1964   D. BERLIN   3,150,616
CONVERTIBLE CART
Filed Oct. 25, 1961   3 Sheets-Sheet 3
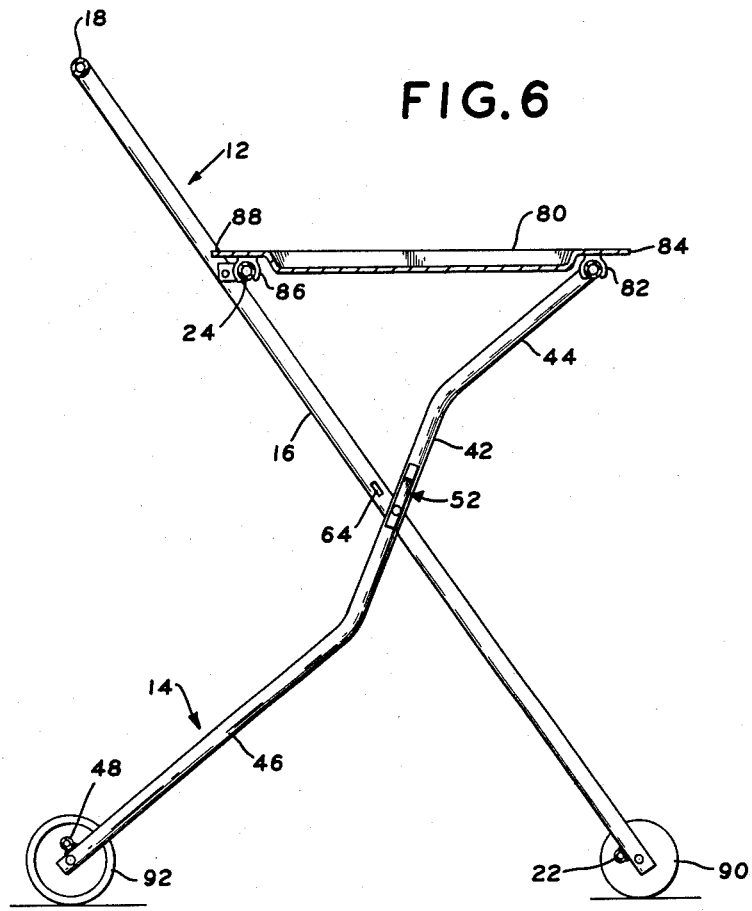
INVENTOR.
DANIEL BERLIN
BY
Caesar and Rivise
ATTORNEYS.

United States Patent Office 3,150,616
Patented Sept. 29, 1964

3,150,616
CONVERTIBLE CART
Daniel Berlin, 4424 Paul St., Philadelphia 24, Pa.
Filed Oct. 25, 1961, Ser. No. 147,497
7 Claims. (Cl. 108—16)

The present invention relates to a convertible cart, and more particularly to a structure that can be used alternatively as a storage rack for tray tables or a serving cart.

There are numerous tray tables now on the market. These tray tables basically comprise a pair of U-shaped leg members which are pivotally secured together and a tray which is releasably securable to the bridging section of each leg member.

It is now common practice to sell tray tables in sets of four with a storage rack for each set. Various structures are available wherein the storage rack can also be used as an additional table or as a serving cart.

One such combined serving cart and storage rack includes a pair of pivotally secured frame members, with one of said frame members providing a portion for receiving and supporting a plurality of tray tables. Each of the frame members is provided with a plurality of wheels on its floor-engaging end. In order to convert the structure from a tray supporting rack to a serving cart it is necessary to rotate the table supporting frame member entirely through the other frame member and secure a table top to the frame members in their rotated position.

The convertible cart of this invention differs from the aforementioned structure in that the instant structure can be converted from a storage rack to a serving cart by merely pivoting one frame member relative to the other. The rotation of one frame member through the other is entirely unnecessary.

It is therefore an object of this invention to provide a novel structure which may be used alternatively as a rack for supporting tray tables or a serving cart.

It is a further object of this invention to provide a structure which may be easily converted from a storage rack to a serving cart.

It is another object of this invention to provide a convertible cart which is adapted to support table tops of varied configurations and sizes.

It is yet a further object of this invention to provide a convertible cart which may be rolled from location to location while a plurality of stacked tables are supported thereon.

These and other objects are accomplished by providing a structure which may be alternatively used as a supporting rack or a serving cart, said structure comprising a first frame means and a second frame means, each frame means including a pair of parallel legs and a bridging section connecting said legs uppermost, said legs being pivotally connected, said legs on said first frame means having a central portion which is parallel to and lies in the same plane as the leg portions of said second frame means and having an upper portion which is integral with said central portion and extending upwardly and outwardly from said central portion, tray means releasably secured to one of said frame means, and means for releasably securing said first frame means to said second frame means.

Other objects and many of the attendant advantages of this invention will be readily appreciated as the same becomes better understood by reference to the following detailed description when considered in connection with the accompanying drawings wherein:

FIG. 1 is a perspective view of the convertible cart of this invention showing the structure as a rack supporting a plurality of collapsed tray tables, and illustrating the tray top for the serving cart;

FIG. 2 is a perspective view of the convertible cart of this invention, shown as a supporting rack, with the tray tables and tray top removed;

FIG. 6 is an enlarged sectional view taken along the line 6—6 of FIG. 5;

FIG. 7 is an enlarged sectional view, partially in phantom and partially in perspective for the purpose of clarity, taken along the line 7—7 of FIG. 2;

FIG. 8 is a partial perspective view of the tray supporting tube in its closed position; and FIG. 9 is a partial perspective view of the tray supporting tube in open position.

Figure 3:
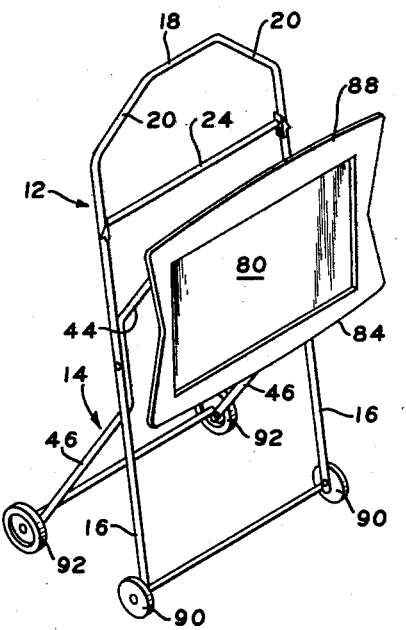
FIG. 3 is a perspective view of the convertible cart of this invention, shown as a supporting rack with the tray top in place.

Referring now in greater detail to the various figures of the drawings wherein similar reference characters refer to similar parts, a convertible cart embodying the present invention is generally shown at 10 in FIG. 2. Device 10 basically comprises a first frame member 12 and a second frame member 14.

Frame member 12 is generally U-shaped, and includes parallel tubular legs 16 and tubular bridging section 18 uppermost. The upper portions of leg 16 are inclined inwardly at 20 for ornamental purposes. Secured to the lower portions of leg 16 is a reinforcing tube 22. Tube 22 is preferably welded to legs 16, but may be secured by other means such as bolts.

Pivotally secured to the upper portions of legs 16 is a tray supporting tube 24. Tube 24 is secured to brackets 26 and each bracket 26 is pivotally secured to leg 16 by means of pins 28. As seen in FIGS. 8 and 9, each bracket 26 includes a flat face 30 which is substantially tangent to the inner surface of leg 16, and to which tube 24 is secured. Integral with flat face 30 and extending perpendicularly outward therefrom is a triangular shaped face 32. As seen in FIG. 9, when tube 24 is extended upwardly, the inner surface 34 of triangular face 32 abuts the outer surface of leg 16. When tube 24 is rotated in a counterclockwise direction, as viewed in FIG. 2, the rotational movement is halted by the lower edge 36 of triangular face 32, as viewed in FIG. 9.

Thus it becomes apparent that when utilizing brackets 26, tube 24 can be rotated through an angle of approximately 90°. The purpose of this rotational movement will be explained hereinafter.

As seen in FIG. 2, second frame member 14 includes a pair of parallel tubular legs 38 having an integral upper bridging section 40. The central portions 42 of legs 38 are coplanar with legs 16 when the device is in the tray table supporting position of FIG. 2. Upper portions 44 of legs 38 extend upwardly and away from legs 16 of first frame member 12. Lower portions 46 of legs 38 extend downwardly and away from leg 16, but in the opposite direction to upper portions 44. Secured to the lower portions 46 of legs 38 is a reinforcing tube 48. Tube 48 is preferably welded to lower portions 46, but may be secured by other means such as bolts.

First frame member 12 is secured to second frame member 14 by means of pins 50 (FIG. 7) which pass through legs 16 and central portions 42 of legs 38. Secured to pin 50 is a leaf spring lock 52. The purpose of lock 52 is to retain device 10 in its tray table supporting position shown in FIG. 2. Lock 52 basically comprises a spring steel leaf 54 (FIG. 7), which leaf is held in abutting relationship with central portion 42 by means of head 56 on pin 50. The top portion 58 of leaf 54 is bent outwardly and upwardly to permit easy grasping of the lock. Secured to leaf 54, or integral therewith, is a finger 60. Finger 60 passes through slot 62 in leg 38 and into slot 64 in leg 16. Thus, as seen in FIG. 7, when finger 60 engages leg 38 and leg 16, pivotal movement about pin 50 is prevented. When it is desired to pivot frame member 12 relative to frame member 14, to convert device 10 from a storage rack to a serving cart, lock 52 is pulled in the direction of arrow 66 to the position indicated by 52'. In this latter position finger 60 is disengaged from slot 64 and the two frame members can easily be pivoted. A second lock 52 may be used in connection with the second pair of legs 16 and 38 (FIG. 6).

The use of device 10 as a storage rack for tray tables is illustrated in FIG. 1. As seen therein, four tray tables 70 are supported on upper portion 44 of frame member 14 with the rearward table resting against frame member 12. Each tray table includes a tray 72 having a first pair of U-shaped legs 74 and a second pair of U-shaped legs 76 pivotally secured thereto. Although not shown, each tray 72 contains a plurality of spring clips secured to the under surface of each of the upper and lower long edges thereof. In the position shown in FIG. 1 the spring clips secured to the upper edge 78 of tray 72 are secured to the bridging section of U-shaped legs 74. The tray table rests on the edge of tray 72 with legs 76 pointing upwardly. When assembling the tray table, it is merely necessary to remove the table from the rack, pivot legs 76, and secure the spring clips from the lower edge of tray 72 to the bridging section of legs 76. The specific details of each tray table 70 are well known in the art and form no part of this invention.

The fifth tray 80 is provided as a table top for device 10. When the device is converted from a storage rack to a serving cart, tray 80 serves as the table top for the cart. As seen in FIG. 1, tray 80 can be identical in structure to tray 72 of the tray table. However, tray 80 can be of any shape or configuration desired. As seen in FIG. 6, tray 80 includes a pair (one shown) of spring clips 82 secured to the under surface of elongated edge 84 and a pair (one shown) of spring clips 86 secured to the under surface of elongated edge 88. Spring clips 82 and 86 are adapted to snap on to a tubular member and are quickly released when pulled from the member. These spring clips are identical to the clips normally used on the conventional tray tops for tray tables.

As seen in FIGS. 1 and 2, a pair of wheels 90 are rotatably secured to the bottoms of legs 16. The second pair of wheels 92 are rotatably secured to the bottoms of legs 38. When it is desired to move device 10 from one position to another with the tray tables stacked thereon, it is merely necessary to pull bridging section 18 of first frame member 12 rearwardly as seen in FIG. 1 and push the storage rack to the desired location on wheels 92. When the storage rack is not being moved around, it will remain upright due to the inclination of frame member 12 relative to frame member 14. The placing of tray table 70 on the rack will not lessen this stability.

Figure 4:
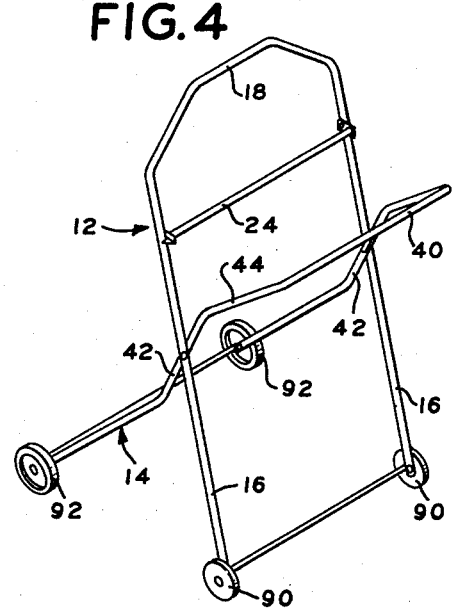
FIG. 4 is a perspective view of the convertible cart of this invention, shown in its serving cart position with the tray top removed.
Figure 5:
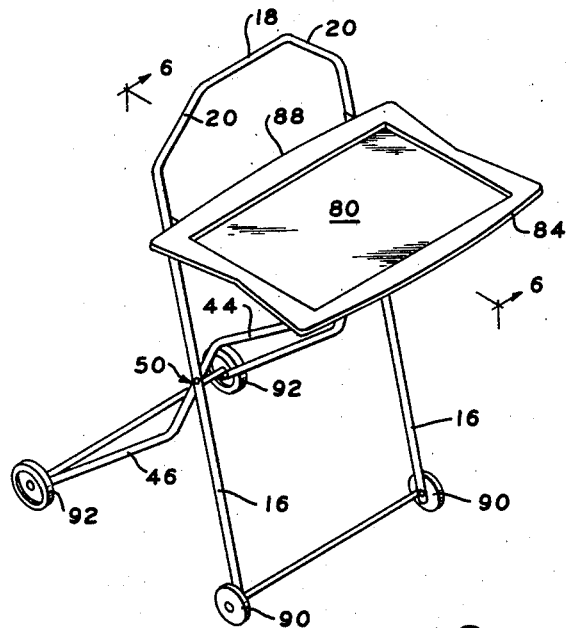
FIG. 5 is a perspective view of the convertible cart of this invention similar to FIG. 4, but showing a tray top in place.

The conversion of device 10 from the storage rack to a serving cart is illustrated in FIGS. 3 to 5.

As seen in FIG. 3, all of the tray tables 70 have been removed from the rack. Tray top 80 is then removed. Leaf spring locks 52 are pulled inwardly, thus rendering frame member 12 free to pivot with respect to frame member 14. After releasing the locks, the two frames are pivoted apart, in the nature of opening a scissors, as shown in FIG. 4. Tube 24 is then rotated into its downward position as shown in FIGS. 4 and 9. The cart is completed and the two frame members are retained in their open position by snapping the spring clips of tray 80 on tube 24 and bridging section 40 (FIG. 6).

The purpose of having tube 24 pivotally mounted will now be explained. As seen in FIG. 3, the height of tray 80 is not constant. The centers of upper edge 88 and lower edge 84 (FIG. 6) extend outwardly from the remainder of the tray 80. If tube 24 were permanently secured in the position shown in FIG. 3, tray 80 would, of necessity, have to be of a width narrower than the separation of the two legs 16. However, by pivoting tube 24 to the position shown in FIG. 4, the tray is supported outwardly from legs 16 and thus the width of the tray can be as desired. Thus, as seen in FIG. 6, although the central portion of upper edge 88 extends to the area between legs 16, clips 86, which are secured on tube 24, are positioned well in front of legs 16. The only limitation placed on tray 80 is that the spring clips on the under surface thereon be spaced at such a distance as to insure tray 80 will be horizontal when snapped on tube 24 and bridging section 40.

With tray 80 and frame members 12 and 14 in the position shown in FIGS. 5 and 6, device 10 can be used as a serving cart. Thus different items can be placed on the tray and the cart conveniently wheeled from one place in the room to another. When it is desired to reconvert the cart to a storage rack, tray 80 is removed and frame members 12 and 14 are pivoted toward each other, which movement is in the nature of closing a scissors. When central portions 42 and legs 16 are aligned, spring locks 52 are reengaged in slots 62 and 64. The change is completed by rotating tube 24 counterclockwise as viewed in FIG. 4. Tray 80 is then snapped on to bridging section 40.

If a relatively short tray top is used, tray 80 could be secured to tube 24. Thus when converting device 10 from a storage rack to a serving cart it would not be necessary to disconnect tray 80. Tube 24 would be rotated downwardly, as previously done, and the lower edge of tray 80 would be rotated upwardly and secured in place by snapping spring clips 82 on bridging section 40.

Obviously many modifications and variations of the present invention are possible in the light of the above teachings. For instance, instead of having lock 52 abutting against the interior surface of central portion 42, it can be placed on the outside of frame member 12. Thus lock 52 would abut against the exterior surface of leg 16, and pass through said leg and into central portion 42. It is, therefore, to be understood that within the scope of the appended claims, the invention may be practiced otherwise than as specifically described.

I claim:
1. A structure for use as a supporting rack or a serving cart, said structure comprising a first frame means and a second frame means, each frame means including a pair of parallel legs and a bridging section connecting uppermost ends of each pair of said legs, said frame means being pivotally connected, said legs on said first frame means having an upper portion which is inclined upwardly and away from the legs of said second frame means, tray means associated with one of said frame means, and a pivotally mounted transverse support means extending between the legs of said second frame means.

2. The structure of claim 1, and including a pair of brackets, each one of said pair being pivotally secured to one leg of said second frame means, with said transverse supporting means being secured between said brackets.

3. The structure of claim 2 wherein each bracket comprises a flat portion which extends substantially tangentially to the interior surface of each leg of said second frame means, and includes a triangular section extending perpendicularly outwardly from said flat section, said triangular section being shorter that said flat section, said flat section having the lower portion thereof pivotally secured to said leg, whereby the lower edge of said triangular section will limit rotation about the pivotal securement when the transverse supporting means is pivoted downwardly.

4. The structure of claim 1 wherein said tray means is releasably secured to one of said frame means.

5. A structure for use as a supporting rack or a serving cart, said structure comprising a first frame means and a second frame means, each frame means including a pair of parallel legs and a bridging section connecting uppermost ends of each pair of said legs, said frame means being pivotally connected, said legs on said first frame means having an upper portion which is inclined upwardly and away from the legs of said second frame means, and means for releasably securing said first frame means to said second frame means to maintain the structure in its rack supporting orientation, said releasable securing means comprising a leaf spring held in an abutting relationship to one leg of said first frame means, said leaf spring including a finger thereon, said finger passing through aligned slots in the legs of said first and second frame means.

6. The structure of claim 5, and including a plurality of resiliently mounted locks on said legs.

7. The structure of claim 5, and including a pivotally mounted transverse supporting means extending between the upper portions of the parallel legs of said second frame means.

References Cited in the file of this patent

UNITED STATES PATENTS

| | | |
|---|---|---|
| 1,737,276 | Taglang | Nov. 26, 1929 |
| 1,924,824 | Yeager | Aug. 29, 1933 |
| 2,998,884 | Klein | Sept. 5, 1961 |
| 3,017,034 | Klein | Jan. 16, 1962 |